Nov. 6, 1934. W. W. WEHR 1,979,718
MOTOR DRIVEN SOUND AND PICTURE RECORDING CAMERA AND REPRODUCER
Filed Sept. 25, 1930   4 Sheets-Sheet 3
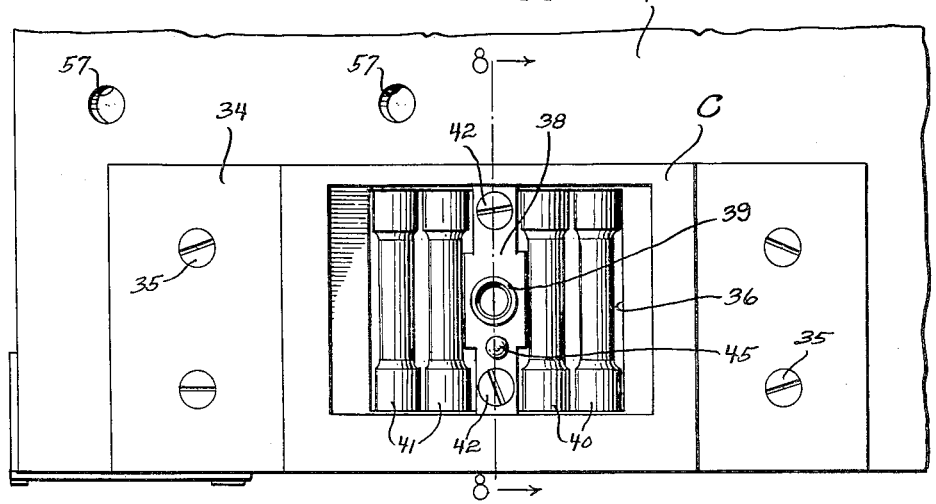
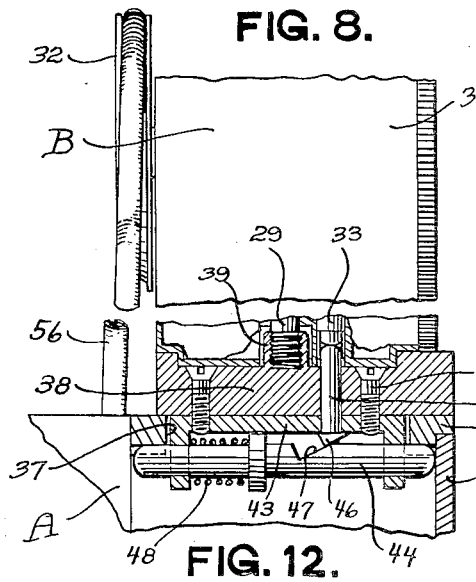
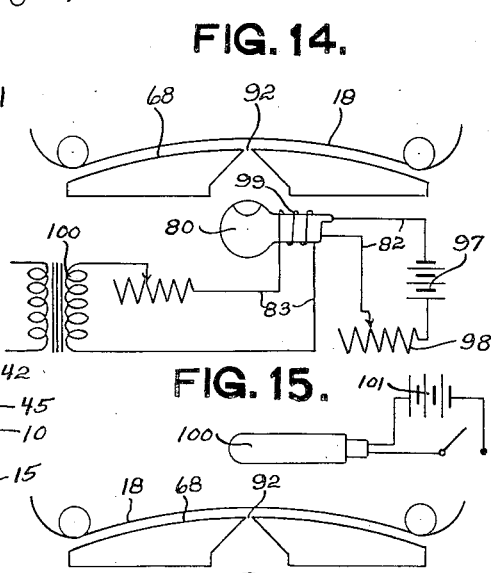
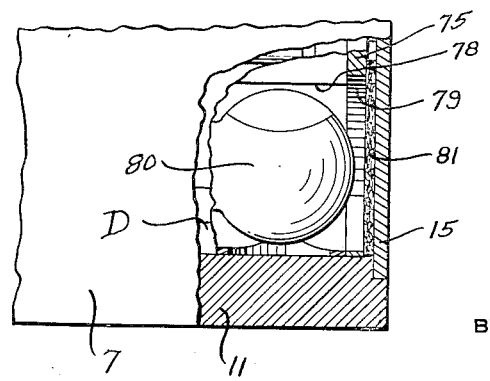
INVENTOR.
Walter W. Wehr
BY Lancaster, Allwine and Rommel
ATTORNEYS.

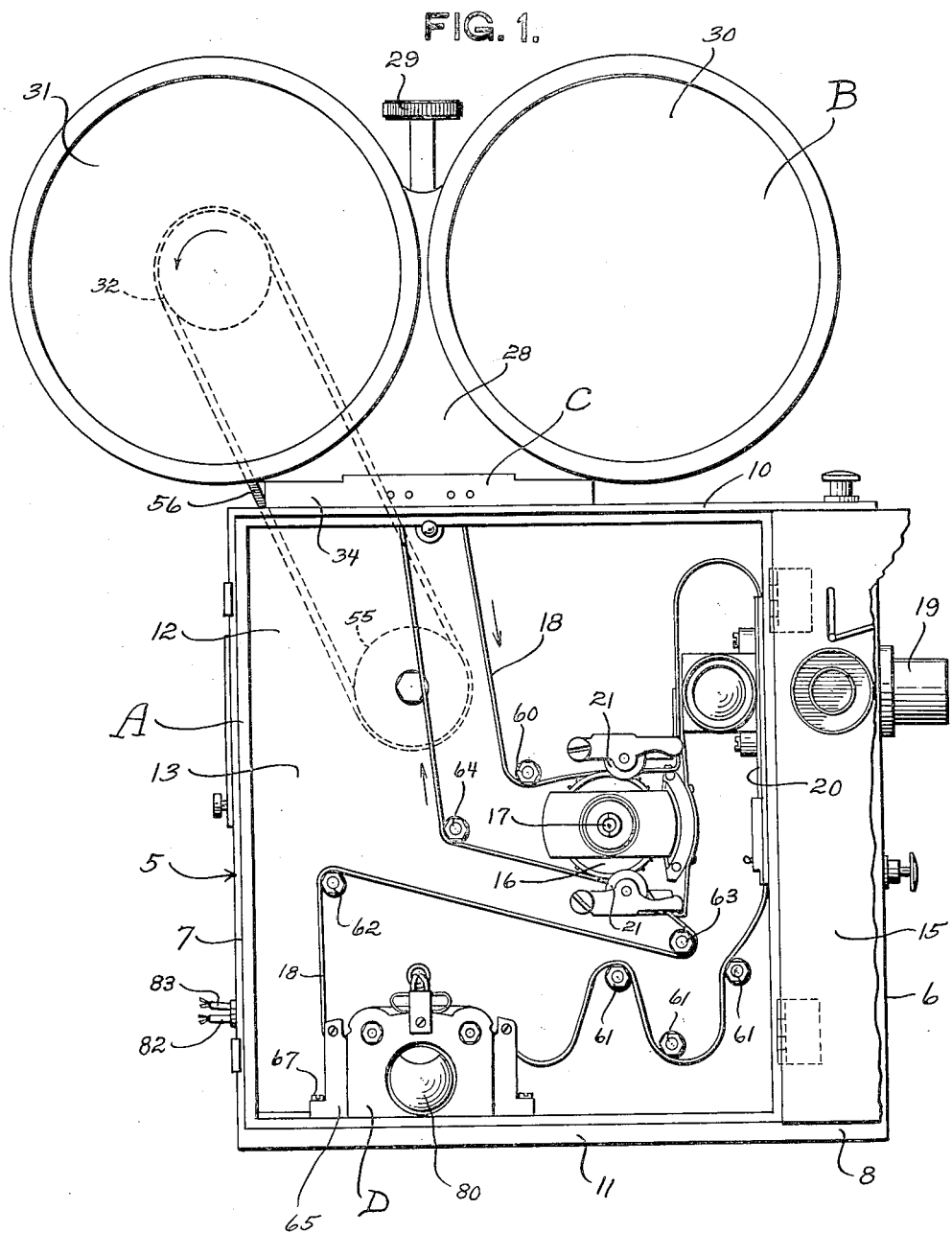

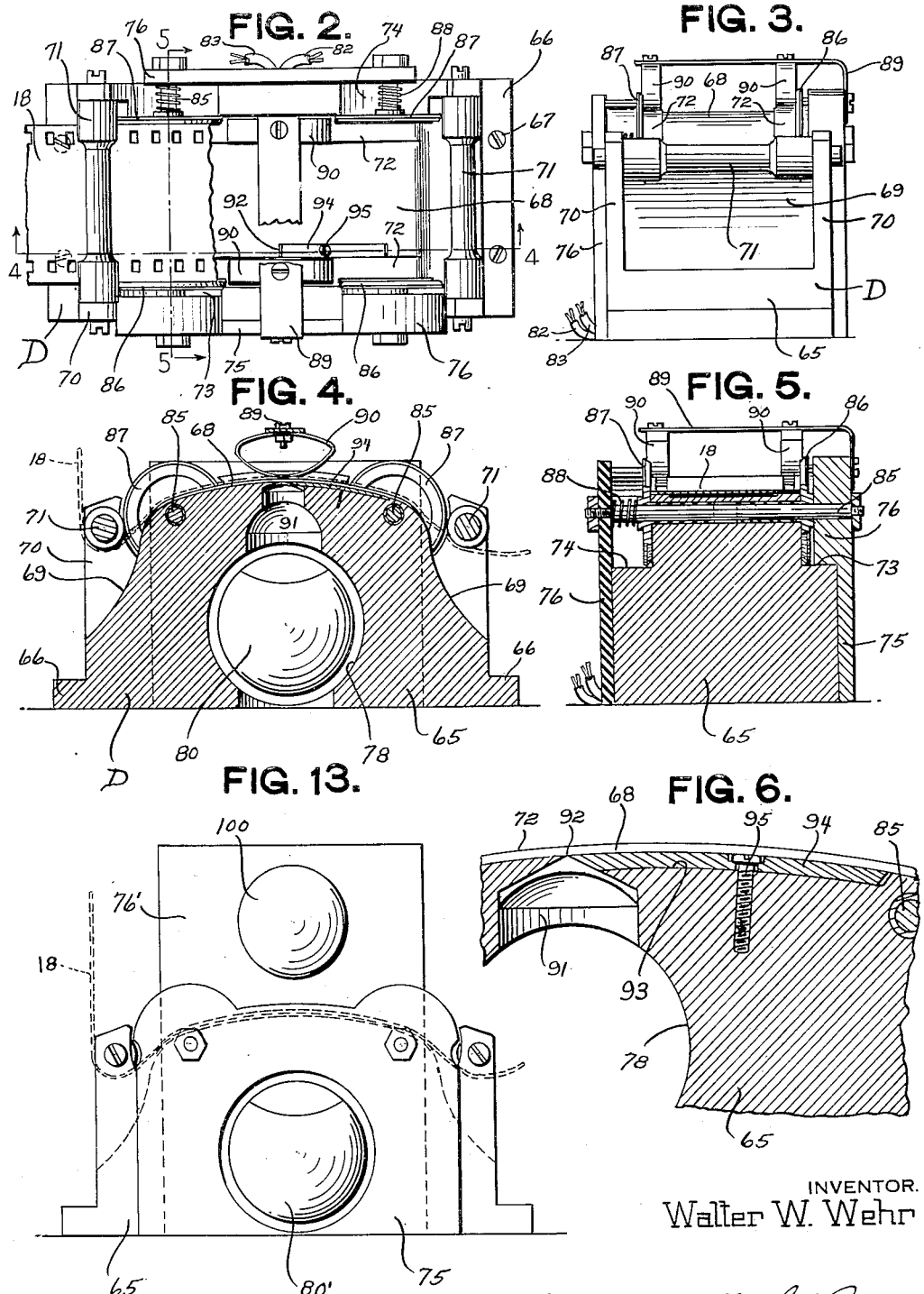

Nov. 6, 1934.   W. W. WEHR   1,979,718
MOTOR DRIVEN SOUND AND PICTURE RECORDING CAMERA AND REPRODUCER
Filed Sept. 25, 1930   4 Sheets-Sheet 4

INVENTOR.
Walter W. Wehr

BY Lancaster, Allwine and Rommel
ATTORNEYS.

Patented Nov. 6, 1934

1,979,718

UNITED STATES PATENT OFFICE

1,979,718

MOTOR DRIVEN SOUND AND PICTURE RECORDING CAMERA AND REPRODUCER

Walter W. Wehr, Allentown, Pa.

Application September 25, 1930, Serial No. 484,422

5 Claims. (Cl. 179—100.3)

The present invention relates to cameras and the primary object of the inventon is to provide an improved motor driven sound and picture recording camera and reproducer wherein the sound waves and pictures are photographically recorded upon the same film.

A further object of the invention is to provide improved apparatus for converting a standard form of motion picture camera into a combined sound and picture recording camera.

A further object of the invention is to provide a motor driven sound and picture recording camera wherein the film is held at a constant speed during recording thru a direct drive coupling to the electric motor.

A further object of the invention resides in the novel recording arrangement which eliminates the necessity of moving the sound track on the positive print thru recording the sound at a distance on the film in advance of the point of picture recording, corresponding to the distance in a projector when the sound and pictures are reproduced.

A further object resides in the novel arrangement whereby the film capacity of a standard form of camera may be increased thru mounting of the film magazine exteriorly of the camera case.

A still further object resides in the novel arrangement for operating the light valve in the film magazine upon opening of the camera door.

A further object of the invention is to provide an improved sound head for photographically recording sound waves upon motion picture films.

A further object of the invention is to provide a sound recording and reproducing unit wherein the recording is of the straight line variable density type and wherein spherical aberration is eliminated and an exact image of the light slit obtained upon the finished print.

A further object resides in the novel arrangement whereby the film is held against lateral movement during passage thru the recording and reproducing unit.

A still further object resides in the improved manner in which the sound recording lamp is controlled according to the frequencies of electrical energy delivered by the microphone.

A still further object resides in the novel arrangement whereby the light intensity of the sound recording lamp may be varied for producing the same exposure upon the sound track as upon the picture track so as to insure good sound recording even tho the picture is under exposed and also simplifying developing methods.

A still further object is to provide a sound head having a film runway of such shape as to require a minimum amount of tension upon the film, one wherein scratching and abrasion of the film surface is prevented, and one embodying a novel arrangement for varying the width of the light slit.

Other objects and advantages of the invention will be apparent during the course of the following detailed description, taken in connection with the accompanying drawings forming a part of this specification and in which drawings:

Figure 1 is a side elevation of the device showing one of the side doors swung open to show the sound recording unit and the manner in which the film is threaded thru the camera.

Figure 2 is a top plan view of the sound head or unit and showing the manner in which the film is threaded therethru.

Figure 3 is an end elevation of the sound head or unit.

Figures 4 and 5 are sections on the respective lines in Figure 2.

Figure 6 is an enlarged fragmentary detail view taken longitudinally thru the sound head and showing the adjustable blade for varying the width of the light slit or aperture.

Figure 7 is an enlarged top plan view of the magazine mount shown in position upon the top of the camera case.

Figure 8 is a fragmentary section on the line 8—8 of Figure 7 showing the arrangement for controlling the light valve in the film magazine.

Figure 12 is a fragmentary detail view part in section and part in elevation showing the arrangement for preventing light from the sound recording light from striking the film except thru the recording aperture, when the camera door is closed.

Figure 13 is a view in side elevation of the sound head when altered for use as a reproducer.

Figure 14 is a diagrammatic illustration of the sound head when used for recording purposes.

Figure 15 is a diagrammatic illustration of the sound head when used as a reproducer.

Figure 10:
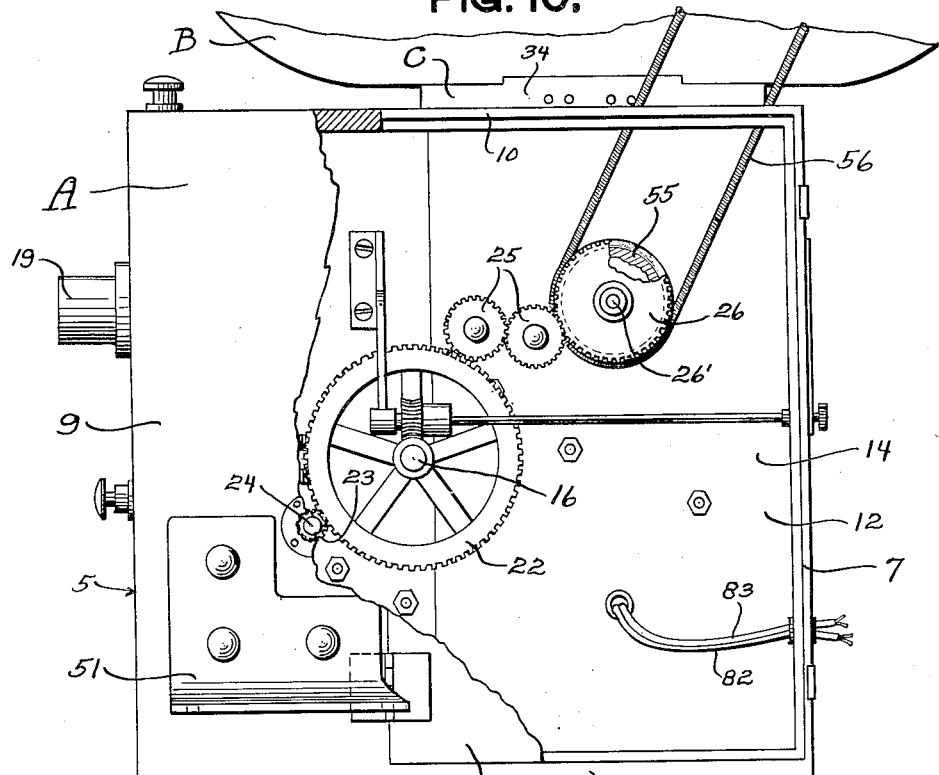
Figure 10 is a view looking at the opposite side of the camera from that shown in Figure 1 and showing a portion of the door and side wall of the casing broken away for illustrating the manner and location of mounting the take-up pulley for actuating the take-up reel.

Referring to the drawings in detail, and wherein similar reference characters designate corresponding parts thruout the several views, the letter A designates a motion picture camera provided with a film magazine B supported exteriorly and upon the upper side of the camera case as by an improved magazine mount C thru which the film from the magazine travels to and from the exposure chamber or compartment in the camera case. The letter D designates a sound head or unit for mounting within the camera to record photographically as by a sound track produced upon the film, sound waves desired to be recorded in synchronism with the pictures being recorded upon the same film. The letter E designates motor drive means carried by the camera and having a direct drive coupling for operating the camera at a constant speed during recording.

The camera A is of usual construction in its general make-up and comprises a case or box 5 providing front and rear walls 6 and 7 respectively, side walls 8 and 9, and top and bottom walls 10 and 11 respectively. Arranged between the side walls 8 and 9 is the usual partition wall 12 dividing the case into an exposure chamber or film compartment 13 at one side of the partition and a driving mechanism chamber 14 at the opposite side of the partition. The side wall 8 extends for but a short distance along the forward portion of the case and has hingedly connected to its rear edge a door 15 adapted to close over the film chamber 13 to provide a light proof compartment thru which the film travels during the photographic recording.

Mounted in the forward portion of the film compartment 13 substantially midway between the top and bottom walls 10 and 11 is a drive sprocket 16 which is affixed to a sprocket or crank shaft 17 journaled in a suitable bracket and having one end extending thru the partition wall 12 into the chamber 14. This sprocket 16 serves as a feed and take-up sprocket for the film 18 of usual construction and provided along each edge with the perforations for feeding of the film thru the camera. Mounted in the forward portion of the box 5 is a lens 19 thru which light is permitted to pass for photographically recording pictures upon the film 18 and moved with an intermittent movement thru the film gate 20. The usual guide rollers 21 coact with the sprocket 16 for retaining the film in its proper path of travel about the sprocket.

Arranged in the chamber 14 is the drive gearing for the camera and in the illustration shown embodies a large gear 22 which is affixed to the crank shaft 17 carrying the sprocket 16. Meshing with the gear 22 is a pinion 23 which is affixed to a drive shaft 24 having its inner end journaled in the partition 12 and having its outer end projecting for a short distance thru the side wall 9. Meshing also with the large drive gear 22 are idler gears 25 one of which meshes with the take-up gear 26 journaled in the partition 12. The chamber 14 is closed by a hinged door 27 which may be hinged to the rear edge of the side wall 9.

That portion of the camera thus far described is of standard construction and forms no part of the present invention aside from its cooperative relation to the apparatus to be subsequently described. With the usual form of camera as herein disclosed the film reels are mounted directly in the camera case with the take-up reel for the film carried by the shaft upon which the take-up gear 26 is mounted. In the invention herein disclosed, the film magazine is mounted upon the upper side of the camera providing for larger film capacity for the film magazine and permitting mounting of the sound recording device within the film chamber 13.

The film magazine B and which is intended to be mounted upon the top of the camera upon the mount C, is of conventional construction and of that type as shown in Patent #1,215,534 granted to A. S. Howell on February 13, 1917. In this form of film magazine is provided means operable by movement of the camera door, either when it is opened thru accident or for the purpose of adjusting the camera mechanism, for immediately closing and sealing the magazine against the entrance of either light or dust. In the present application, the light valves for automatically closing the openings to the film magazine have not been shown, but merely the reciprocable plunger for actuation of the light valves.

Figure 9:
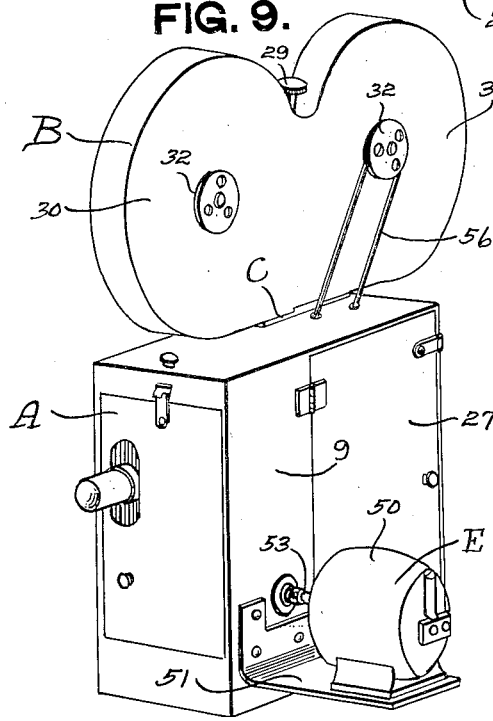
Figure 9 is a perspective view looking at the camera from the opposite side as shown in Figure 1 and showing the manner in which the motor is mounted upon one side of the camera case and also the drive belt for rotating the take-up drum.
Figure 11:
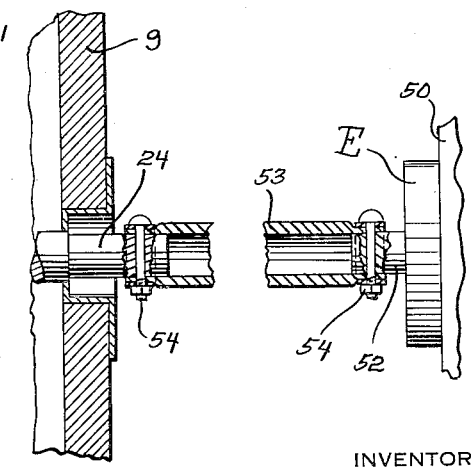
Figure 11 is a fragmentary sectional view showing the flexible coupling means between the electric motor and drive shaft.

The film magazine comprises the base 28 adapted for attachment to the magazine mount C as by an elongated set screw 29 having a threaded lower end as shown in Figure 8 for threaded connection with the mount C. Arranged at either side of the base 28 are the cylindrical film winding casings providing a supply drum 30 for the unexposed film and the take-up or receiving drum 31 for receiving the exposed film after being fed thru the camera. Rotatably mounted in each of the drums 30 and 31 are the usual spools, not shown, upon which the film is wound, and the shaft carrying these spools have mounted thereon exteriorly of the drums, grooved pulleys 32 as shown in Figures 8 and 9.

In the Howell patent referred to, the base 28 is provided with two transversely disposed parallel slots thru which the film is adapted to pass on its way to and from the camera. These slots, not shown, are each closed by pivoted valve plates operated by a reciprocable plunger 33 the lower end of which is shown in Figure 8. This plunger 33 is normally spring urged downwardly to a position whereby the valve plates are normally urged to a position closing the film slots thru the base 28. The plunger 33 is intended to be acted upon by suitable means controlled by the door 15 for immediately closing the film slots in the magazine upon opening of the door.

Referring now to the improved magazine mount C for securing the film magazine B upon the top of the camera A, the same comprises a rectangular-shaped mounting block 34 secured to the top camera wall 10 as by screws, bolts or the like 35. The upper surface of the block 34 has a configuration conforming to the lower side of the magazine base 28 whereby the magazine is held against swinging movement when attached by the single set screw 29. Provided midway the ends of the block 34 is a rectangular-shaped opening 36 which aligns with a corresponding shaped opening 37 provided thru the top camera wall 10. Extending transversely across the central portion of the opening 36 is a cross bar 38 provided midway its ends with an upwardly extending threaded socket 39 for threaded reception of the lower threaded end of the set screw 29. Suitably journaled in the opening 36 at each side of the cross bar 38 and in parallel relation thereto are pairs of guide rollers 40 and 41 which are slightly spaced apart and serve for guiding the film to and from the film slots provided in the magazine base 28.

Secured longitudinally to the under side of the cross bar 38 as by suitable screws or the like 42 is a bracket 43 having downturned ends which extend downwardly thru the opening 37 and provide bearings for reciprocable mounting of an actuating rod 44. Mounted for reciprocable movement thru the cross bar 38 at one side of the socket 39 is a plunger actuating pin 45 which is provided at its lower end with a cam head 46 having bearing contact with the rod 44. The rod 44 is provided with an inclined notch 47 into which the cam head 46 is permitted to move when the rod 44 is projected by means of an expansion coil spring 48 acting to normally project the actuating rod to a position to be engaged by the door 15. A spring action upon the plunger 33 causes the pin 45 to be lowered into the notch 47 when the rod 44 is projected and lowering of the plunger 33 closes the valves controlling the film slots in the magazine base 28.

The outer end of the rod 44 is normally urged into contact with the door 15 and when the door is closed as shown in Figure 8, the door acts to force the rod inwardly causing the pin 45 to be raised and act upon the plunger 33 for opening the magazine valves. Immediately upon opening of the door 15 the spring 48 projects the rod 44 permitting the pin 45 to lower into the notch 47 and the plunger 33 lowered for closing the magazine film valves so that no light is permitted to enter the film drums 30 and 31 while the door 15 is opened for adjustment or inspection of the camera mechanism. The magazine mount C is readily attachable to existing types of motion picture cameras and when applied thereto will permit increased film capacity being had thru mounting of the film magazine exteriorly of the camera.

Referring now to the motor drive means E for constant speed rotation of the sprocket 16, the same embodies an electric motor 50 mounted upon a bracket 51 fixedly secured to the camera side wall 9 in any preferred and suitable manner. This motor 50 is mounted upon the bracket 51 with its armature shaft 52 in spaced axial alignment with the drive or trick picture crank shaft 24 where it projects thru the wall 9. The shafts 24 and 52 are preferably coupled by means of a tubular yieldable coupling 53 which is preferably formed of rubber and has its ends suitably coupled to the shafts as by coupling bolts or the like 54. The motor 50 is preferably a twelve volt D. C., 1/15 H. P. constant speed motor of 1,440 R. P. M. and operates the camera at exactly ninety feet per minute.

Operation of the motor 50 rotates the drive gear 22 thru the pinion 23 which in turn imparts rotation to the take-up gear 26 thru the idlers 25. Affixed to the shaft 26' upon which the gear 26 is mounted is a grooved take-up pulley 55 of a diameter equal to the diameter of the gear 26. Trained over the take-up pulley 55 is a preferably coiled wire belt 56 having the runs thereof extended thru suitable openings 57 and trained over the grooved pulley 32 of the take-up drum 31. The pulley 55 is of like diameter as the pulley 32 of the take-up drum 31 so that the take-up drum is rotated at a proper speed with respect to the rotation of the sprocket 16.

Referring now to the sound head or unit D for photographically recording sound upon the film as fed thru the camera A, the same is intended to be mounted upon the bottom casing wall 11 rearwardly of the sprocket 16. Referring particularly to Figure 1 and wherein is shown the manner and direction of travel of the film 18 thru the camera it will be seen that the film drawn from the supply drum 30 is directed over the upper side of the sprocket 16 by the idler roller 60. From the sprocket 16 the film is looped upwardly and passes downwardly thru the film gate 20 where an intermittent movement is imparted thereto for photographically recording the pictures being taken. As the film leaves the lower end of the film gate it is passed thru idler rollers 61 which are so spaced and arranged as to provide exactly fourteen and one-half inches of film length between the picture recording aperture in the film gate and the sound recording slot in the sound head, corresponding with the distance in film length required in a standard projector between the picture exposing aperture and light slit. A suitable amount of slack is provided between the film gate and sound head for permitting continuous travel of the film thru the sound head. The film after leaving the sound head is tautly drawn over idler rollers 62 and 63 and guided beneath the sprocket 16 and then over an idler roller 64 guiding the film to the take-up drum of the film magazine. While it has been stated that the sound is recorded exactly fourteen and one-half inches ahead of the picture it is to be understood that this dimension of film length between the point of sound and picture recording point may be varied in accordance with the particular type of projection apparatus employed for reproduction. It is also to be understood that the sound head may be mounted in any suitably appropriate location within the camera.

Referring particularly now to the specific construction of the sound head D, the same embodies an elongated sound head block 65 which may be provided at each end of its flat lower surface with mounting flanges 66 for mounting of the block as by suitable fastening elements 67. The upper side of the block is of special formation and is formed with a film track 68 of elongated formation longitudinally of the block and having a slight arcuation from end to end. Formed at each end of the track 68 are rounded cavities 69 the upper portions of which merge in a curve into the ends of the film track as clearly shown in Figure 4. Provided at each side of the cavities 69 are upstanding arms 70, and between each pair of arms is rotatably mounted a guide roller 71. These rollers 71 are spaced slightly from the ends of the arcuated track 68 and serve to guide the film in contact with the film track.

Extending along each side edge of the film track 68 are track flanges 72 which conform to the curvature of the major recessed portion of the track and these flanges are preferably arranged so as to project about .002" above the central portion of the track. These track flanges 72 serve to prevent any abrasion and scratching of the film surface upon which the sound and pictures are recorded. As will be observed in Figures 3 and 5, the side edges of the film provided with the sprocket apertures have sliding movement on the track flanges 72.

Provided in the outer side of the block 65 adjacent each end of the film track 68 are substantially semi-circular shaped cavities 73, while provided at the inner side of the block adjacent each end of the film track are substantially semi-circular shaped cavities 74 which align transversely of the block with the cavities 73. Arranged over the flat outer side of the block 65 is a face plate 75 provided at its upper side with circular portions 76 which project for a short distance into the cavities 73 as shown in Figure 5. Secured to the inner flat side of the printing block 65 is a cover plate 76" preferably formed of an insulating material and having its upper end portion extending over the cavities 74.

Formed transversely thru the sound head block 65 midway the ends thereof and directly beneath the crown or transverse center of the film track 68 is a preferably circular opening 78 which aligns with a similarly shaped opening 79 formed thru the face plate 75. The cover plate 76" of insulating material extends across the inner side of the opening 78 and serves as a support for a suitable socket for mounting of a sound recording lamp 80 adapted to be inserted into the socket from the open outer end of the circular opening 78. The sound recording lamp 80 may be a suitable form of glow lamp employed for transforming electrical energy into light variations. With reference particularly to Figure 12, the door 15 has secured to its inner side a piece of felt or the like 81 which serves to close the outer end of the opening 78 when the door is closed for preventing light from the lamp entering the exposure chamber 13. The wires 82 and 83 for connection to the lamp 80 are preferably led thru the partition 12 into the chamber 14 and then thru the rear wall 7 of the camera case for connection with the pick-up apparatus.

Extended thru the sound head block 65 adjacent each end of the film track 68 are cylindrical shafts 85 which extend axially thru the cavities 73 and 74 with the outer ends of the shafts supported in the circular portions 76 of the face plate 75 and the inner ends of the shafts supported in the insulating cover plate 76". It may here be well to state that the inner ends of the cavities 72 and 74 align with the outer edges of the film track flanges 72. Freely rotatable upon each shaft 85, and disposed in the outer cavities 73 are guide discs 86 which are held against axial movement and in contact with the side edge of the outer track flange by the circular face plate portions 76. Freely rotatable upon the inner end portion of each shaft 85 and arranged in the inner cavities 74 are axially movable guide discs 87 which are normally urged into engagement with the inner edge of the inner track flange by means of an expansion coil spring 88 acting between the cover plate 76" and the guide discs as clearly shown in Figure 5. These co-acting pairs of guide discs 86 and 87 project above the surface of the film track at opposite sides thereof and serve to prevent any side movement of the film during recording. The spring urged discs 87 will at all times retain one edge of the film in contact with the guide discs 86.

Secured in any preferred manner to the face plate 75, or any other desired location upon the block 65 is a bracket 89 having an arm extending transversely across the central portion of the film track 68. This transversely extending portion of the bracket 89 serves to support a pair of spring shoes 90 having spring urged contact with the track flanges 72. These spring shoes 90 are adapted to bear upon the apertured film edges and insure positive contact of the film with the film track at the crown or transverse center of the track. The shoes 90 are elongated transversely of the track and as will be observed in Figure 3 do not project inwardly beyond the inner edges of the track flanges 72 for possible abrasion or scratching of the recording portion of the film.

Provided in the block 65 above the outer end portion of the lamp receiving opening 78 is a light pocket 91 at the upper end of which is provided a light slit 92 having its length extending transversely of the film track 68. This light slit or aperture 92 is provided in the recessed portion of the film track with its outer edge extending to the inner edge of the outer track flange 72 so that the slit is spaced approximately .002" below the film.

The light slit or aperture 92 is adjustable as to width, and the film track 68 is provided adjacent the outer track flange 72 with an elongated recess 93 in which is slidably mounted an adjustable blade or strip 94 having a width equal to the length of the slit 92. This blade 94 extends flush with the recessed portion of the film track and is adjustable by means of a set screw 95 passed thru a slightly elongated slot in the blade and threaded into the block 65. The forward or slit forming end of the blade 94 is ground to a razor edge for co-acting with a razor edge provided at the upper end of the light pocket 91. As will be observed in Figures 2 and 4, the spring shoes 90 will contact with the film in alignment transversely of the film track, with the light slit 92 so that the film is held in proper spaced relation above the light slit. The guide discs 86 and 87 will insure proper recording of the sound track in a straight line along one side of the film.

It will be noted that no lens system is employed between the recording light and printing aperture so that spherical aberration is eliminated and the sound waves will be recorded on the film in straight lines of variable density.

By observing Figure 1 it will be noted that the film moves with an intermittent movement thru the film gate 20 and with a continuous movement thru the sound unit D. The elongated, slightly arched film track 68 provides for a minimum amount of tension being required upon the film in its passage thru the sound unit.

Referring particularly to Figure 14, an improved method is herein shown for controlling the recording lamp 80. The wires 82 and 83 for the recording lamp extend to a source of electrical energy such as a battery or the like 97 and a resistance 98 is connected between one side of the battery and one terminal of the lamp whereby the light intensity of the lamp may be varied in accordance with the exposure of the picture being taken. The glow of the recording lamp may therefore be maintained at a constant brilliancy or varied by means of the resistance 98 to insure the same exposure upon the sound track as that of the picture being recorded. Wound about the recording lamp 80 is a coil 99 which may be connected by the wires 83 to the output 100 of a suitable amplifier whereby the light variations from the lamp 80 will be governed by the frequency responses delivered to the coil 99. The winding 99 will act as a choke and serve to either light the recording lamp quicker or slower according to the frequencies delivered to the coil. By varying the glow of the recording lamp in the manner shown it will be observed that the glow may be varied to correspond with the picture recording to insure good quality of sound recording even tho the picture is under exposed, and this method will also serve to greatly simplify developing methods where the sound exposure does not correspond with the picture exposure.

Referring particularly to Figures 13 and 15, an arrangement has been shown whereby the sound unit may be employed as a reproducer for transforming light energy into electrical energy as recorded upon the film. In Figure 13, the cover plate 76' is extended above the printing block 65 a sufficient distance to permit mounting of an exciting lamp 100 above the light slit for co-acting with the light sensitive cell 80'. As shown in Figure 15 the exciting lamp 100 may have a suitable source of electrical energy supplied thereto as from a battery or the like 101. The cell 80' is suitably coupled to an amplifier 102. Thus it will be seen that the sound unit is readily adaptable for use as either a recorder or reproducer.

From the foregoing it will be apparent that an improved motor driven sound and picture recording camera has been provided whereby sound and pictures may be recorded. It will also be apparent that an improved type of sound recording and reproducing unit has been provided whereby the sound track is produced in such manner upon the film as to insure positive and perfect reproduction. It will further be apparent that a novel arrangement has been disclosed whereby motion picture cameras may be adapted for sound recording.

Changes in detail may be made to the form of invention herein shown and described, without departing from the spirit of the invention or the scope of the following claims.

I claim:

1. A sound unit of the class described comprising a sound head block having an elongated film track along its upper side and slightly arcuated throughout its length, a light slit provided in the track midway the ends thereof and adjacent one side of the track, idler rollers at each end of the block for retaining the film in surface contact with the track thruout the length of the track, and rotatable guide means engageable with opposite side edges of the film intermediate the ends of the track for preventing lateral movement of the film in its passage along the track.

2. In a sound unit of the class described, a sound head block having an elongated, slightly arcuated film track provided along its upper side, a light slit provided midway the ends of the track and adjacent one side thereof, a guide roller mounted in slightly spaced relation from each end of the track and spaced slightly below the ends of the track, rotatable guide discs mounted at one side of the track, and companion guide discs mounted at the opposite side of the track and normally spring urged toward the track for retaining one edge of the film in contact with said first mentioned guide discs in its travel along the film track.

3. In a sound unit of the class described, the combination of a sound head block, an elongated, longitudinally arched film track provided along the upper side of the block and having a track flange along each side thereof elevated above the central portion of the track, a light slit formed in the track midway the ends thereof and adjacent one of said track flanges, guide rollers at each end of the film track for retaining the film in surface contact with the track flanges thruout the length of the track, rotatable guides at one side of the track, and rotatable, spring urged guides at the opposite side of the track for normally urging the film into engagement with said first mentioned rotatable guides.

4. In a sound unit of the class described, the combination of a sound head block, an elongated, longitudinally arched film track provided along the upper side of the block and having a track flange along each side thereof elevated above the central portion of the track, a light slit formed in the track midway the ends thereof and adjacent one of said track flanges, guide rollers at each end of the film track for retaining the film in surface contact with the track flanges thruout the length of the track, guide discs arranged at opposite sides of the film track for determining the path of travel of a film along the film track, and a spring shoe arranged above the central portion of each track flange for bearing upon the edge portions of the film.

5. In a sound unit of the class described, an elongated sound head block, a longitudinally arched film track provided along the upper side of the block, a guide roller mounted beyond each end of the track and slightly below the ends thereof, a shaft extended thru the block adjacent each end of the track, a rotatable guide disc mounted on each shaft at the outer edge of the track and held against axial movement, a rotatable guide disc mounted on each shaft at the inner edge of the track and having axial movement along the shafts, a coil spring encircling each shaft and acting upon said last mentioned guide discs for normally urging the discs toward the track, and a light slit provided midway the ends of the track and adjacent one edge thereof.

WALTER W. WEHR.